Patented Oct. 5, 1954

2,691,015

UNITED STATES PATENT OFFICE 2,691,015

N-(4-THIAZOLINYL-2) SULFENIMIDES

James T. Gregory, Akron, Ohio, assignor to The B. F. Goodrich Company, New York, N. Y., a corporation of New York No Drawing. Application January 9, 1951, Serial No. 205,227

18 Claims. (Cl. 260—243)

This invention relates to a new class of chemical compounds valuable as accelerators for the vulcanization of natural and synthetic rubber and for other purposes, and more specifically pertains to certain N-(4-thiazolinyl-2) sulfenimides and their preparation.

The N-(4-thiazolinyl-2) sulfenimide compounds of this invention possess the general formula

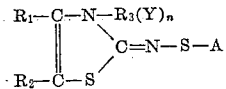

where each of $R_1$ and $R_2$ represents hydrogen or a hydrocarbon radical having its connecting valence on a carbon atom, $R_3$ represents hydrocarbon residues having from 1 to 10 carbon atoms and a furan residue, Y represents hydrogen attached to said residues and also hydroxyl, carboxy, alkoxy, carboalkoxy, halogen and mercapto groups connected to an aliphatic, aryl, aralkyl or cycloalkyl hydrocarbon nucleus and nitro and sulfonyl groups attached to an aromatic nucleus, $n$ is an integer from 1 to 2, and A represents an organic heterocyclic radical attached to the sulfur of the sulfenimide group by a carbon atom which in turn is attached to a ring nitrogen atom and a ring sulfur atom. The symbol A can be represented generically as an

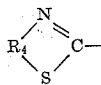

group wherein $R_4$ represents a divalent hydrocarbon radical having from 2 to 12 carbon atoms and the free valence on the carbon atom is the point of attachment to the sulfur atom of the sulfenimide group. $R_4$ is the hydrocarbon moiety of a thiazine, thiazoline or a thiazole compound.

These N-(4-thiazolinyl-2) sulfenimides are excellent accelerators of vulcanization of polymeric organic rubbery materials such as natural crude rubber and synthetic rubbery materials, and they are exceptionally useful as delayed action vulcanization accelerators. Also these sulfenimides can be used as insecticides for domestic and agricultural purposes. They can be used as fungicides against microorganisms which produce plant diseases, they may be used to prevent mildew of fabrics and leather and rotting of wood, or they may be employed to treat seeds, bulbs, corms, and tubers to protect them from rot and disease causing microorganisms during storage and after planting.

The N-(4-thiazolinyl-2) sulfenimides of this invention are formed by the basic reaction of a heterocyclic mercaptide (that is, a salt of a heterocyclic mercaptan) with a 2-haloimino-4-thiazoline according to the following reaction equation where a sodium heterocyclic mercaptide is employed for illustrative purposes:

(I)

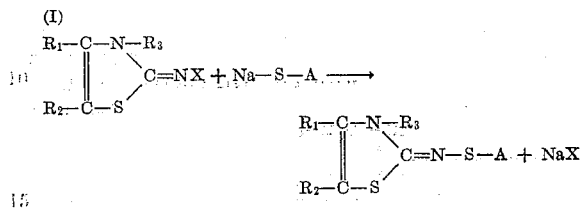

where $R_1$, $R_2$, $R_3$ and A have the same significance as described above and X is a halogen atom. The 2-haloimino-4-thiazoline compounds can be prepared by the reaction of 2-imino-4-thiazoline compounds with a hypohalite as described in my copending application Ser. No. 193,282, filed October 31, 1950, now Patent No. 2,626,950, issued January 27, 1953. A method for preparation of the 2-imino-4-thiazoline compounds used in such reaction is disclosed in my copending application Ser. No. 193,281, filed October 31, 1950, now Patent No. 2,626,948, issued January 27, 1953. It is not necessary to prepare separately the 2-haloimino-4-thiazoline reactant, for it can be readily formed in situ by reacting a 2-imino-4-thiazoline with a hypohalite.

A preferred method of preparing the sulfenimides of this invention consists of the following steps. First there is prepared an aqueous solution of a water soluble salt of the heterocyclic mercaptan. This can be accomplished by adding the mercaptan to an aqueous solution of such alkaline materials as sodium or potassium carbonates or hydroxides. In this manner an alkaline solution of a water-soluble mercaptan is formed. Then to this alkaline solution there is preferably, but not essentially, added a small amount of an aqueous solution of a surface active agent (wetting or dispersing agent) to aid in the formation of small discrete particles of the sulfenimide product. While the resulting mixture is stirred as rapidly as possible there is next added an aqueous solution of a 2-imino-4-thiazoline hydrohalide containing sufficient imino thiazoline hydrohalide so that there will be one molecular equivalent of imino thiazoline present for each molecular equivalent of heterocyclic mercaptan used. A finely-divided mercaptan, imino thiazoline salt, forms as a precipitate. The precipitated aqueous medium is then stirred vigorously to maintain a uniform slurry of the salt and is cooled to a temperature of from 0° to 35° C. Then, while the cooled slurry is vigorously stirred, an aqueous solution of a water-soluble hypohalite is added slowly. The best results are obtained by employing the hypohalite in amount in excess of that calculated for the reaction (more than one molecular equivalent of hypohalite for each molecular equivalent of imino thiazoline) but in not more than a 50% excess. The reaction mixture is then stirred and maintained at a temperature between 0° C. and 35° C., for a short period of time after all the hypohalite has been added, 10 to 15 minutes generally being sufficient, after which the reaction mixture is heated rapidly to a temperature of from 45° to 100° C. This last heating step is not essential, for good yields of the sulfenimides can be obtained without heating. But, by employing higher temperatures after the addition of hypohalite has been completed, high yields, above 90%, of the sulfenimides of high purity can be obtained. The sulfenimides of this invention form as finely-divided solid precipitates which can be readily recovered from the aqueous reaction medium by filtration or decantation.

In the preferred method just described the non-aqueous reaction diluents commonly employed in the synthesis of organic compounds such as benzene, petroleum hydrocarbons, ethers and higher ketones can be employed in place of water. But since water is readily available at the lowest cost, it is the preferred diluent as a modification of the preferred method described above, the imine-mercaptan salt can be formed by directly reacting the heterocyclic mercaptan with a 2-imino-4-thiazoline base and then reacting this salt with the hypohalite as described above.

The preferred method described above is believed to go through the basic reaction hereinbefore set forth, but instead of preparing the 2-halo-imino-4-thiazoline reactant separately it forms in situ and immediately reacts with the mercaptide to form the sulfenimide. Thus, in the preferred method, reactions take place according to the following reaction equations where sodium carbonate is employed to form the water-soluble mercaptide and sodium hypochlorite is employed to illustrate the hypochlorite:

(1) 

(2) 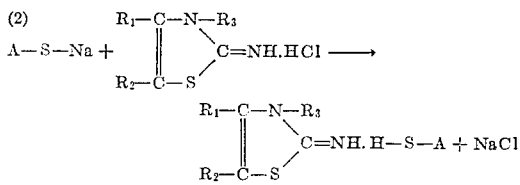

(3) 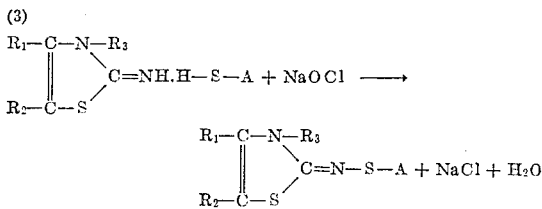

where R₁, R₂, R₃, and A have the same significance as described above.

Where the haloimino compound is prepared separately and reacted with a heterocyclic mercaptide, an aqueous diluent or non-aqueous reaction diluent such as benzene, alcohols, ethers, petroleum hydrocarbons and higher ketones may be employed. This reaction can be carried out at temperatures from 0° C. to 100° C., if desired, but reaction temperatures from 35° C. to 85° C. will, in most cases produce the best results.

The hydrohalides such as the hydrochlorides, hydrobromides and hydroiodides of any 2-imino-4-thiazoline as well as any of the free bases can be employed as reactants to prepare the sulfenimides of this invention. As specific compounds there may be employed as reactants 2-imino-3-methyl-4-thiazoline, 2-imino-3,4-diethyl - 4 - thiazoline, 2 - imino - 3,4,5 - trimethyl-4-thiazoline, 2-imino-3-methyl-4-ethyl-4-thiazoline, 2-imino-3-isopropyl-4,5-dimethyl-4-thiazoline, 2-imino-3-butyl-5-methyl-4-thiazoline, 2-imino-3,5-diisopropyl-4-thiazoline, 2-imino-3,5-dipropyl-4-methyl-4-thiazoline, 2-imino-3-amyl-4-hexyl-5-ethyl-4-thiazoline, 2-imino-3-cyclohexyl-4,5-dimethyl-4-thiazoline, 2-imino-3,5 - diallyl - 2 - methyl - 4 - thiazoline, 2 - imino-3-benzyl-4-allyl-5-ethyl-4-thiazoline, 2-imino-3-cyclohexyl-4-thiazoline, 2-imino-3-phenyl-4-thiazoline, 2-imino-3-propyl-4-phenethyl-5-ethyl-4-thiazoline, 2-imino-3,4-dimethyl-5-phenyl-4-thiazoline, 2-imino-3-benzyl-4-methyl-5-phenyl-4 - thiazoline, 2 - imino - 3 - phenyl -4 - naphthyl-5-methyl-4-thiazoline, 2-imino-3-naphthyl-4-methyl - 5 - naphthyl - 4 - thiazoline, 2 - imino-3 - methyl - 4 - benzothiazoline, 2 - imino - 3,5-dibenzyl-4-thiazoline, 2-imino-3-(3-carboxy-4-hydroxyphenyl)-4,5 - dimethyl - 4 - thiazoline, 2-imino - 3 - (beta-amino - ethyl) - 4,5 - dimethyl-4-thiazoline, 2-imino-3-(beta-chloroethyl)-4,5-dimethyl-4-thiazoline, 2-imino-3-(orthohydroxyphenyl)-4,5-dimethyl-4-thiazoline, 2-imino-3-(beta - carbomethoxyethyl) - 4,5 - dimethyl - 4-thiazoline, 2-imino-3-(2-furan)-4,5-dimethyl-4-thiazoline, 2-imino-3-(para-nitrophenyl)-4,5-dimethyl-4-thiazoline, 2-imino-3-(methoxypropyl)-4,5-dimethyl-4-thiazoline, 2-imino-3-(ortho-mercaptophenyl)-4,5-dimethyl-4-thiazoline, and 2-imino-3-(ortho-benzene sulfonic acid)-4,5-dimethyl-4-thiazoline and the like, as well as the hydrochlorides, hydrobromides and hydroiodides of these imino thiazolines.

The above compounds can be employed in the preferred method of preparing the sulfenimides hereinbefore set forth in detail. The haloimino derivatives of the above 2-imino-4-thiazolines such as the 2-chloroimino, 2-bromoimino, 2-iodoimino, and derivatives can, of course, be prepared separately and can be reacted with a heterocyclic mercaptide according to the basic reaction to prepare the sulfenimides of this invention.

Suitable heterocyclic mercaptans which can be employed as reactants per se in the preferred method or whose mercaptides can be employed with the separately prepared 2-haloimino-4-thiazolines in the preparation of the compounds of this invention are the 2-mercaptothiazoles, 2-mercaptothiazines, and 2-mercaptothiazolines. Specific compounds illustrating these heterocyclic mercaptans are 2-mercaptothiazole, 2-mercapto-4,5-dimethylthiazole, 2-mercapto-4-methylthiazole, 2-mercapto-4-benzylthiazole, 2-mercapto-5-phenylthiazole, 2-mercapto-4-ethylthiazole, 2-mercaptobenzothiazole, 2 - mercapto - 4,5,6 - trimethyl thiazine, 2-mercapto-4-phenylthiazoline, 2-mercapto-5-phenylthiazoline, 2-mercapto-4-methylthiazoline, 2-mercapto-4,5-dimethylthiazoline, 2-mercapto-4,5-tetramethylenethiazoline, 2-mercapto-4-methyl-4-ethylthiazoline, 2-mercapto - 4 - methyl - 4 - ethylthiazoline, 2-mercapto-4-propylthiazoline, 2-mercapto-4,5-dimethyl-5-ethylthiazoline, 2-mercapto-4-propyl-5-isopropylthiazoline, 2-mercapto-4-propyl-5,5-dimethylthiazoline, 2-methyl-4-propyl-5-methyl-5-ethylthiazoline, 2-mercapto-4,5-diphenylthiazoline, 2-mercapto-4,6,6-trimethylpenthiazoline, 2-mercapto-6-methylpenthiazoline, 2-mercapto-4-benzylthiazoline, and 2-mercapto-6-methyl-4,6-dipropylthiazoline among others. When mercaptides of the above are employed as reactants in an aqueous reaction medium, the use of a water-soluble mercaptide is of course desirable. When an organic diluent is employed any mercaptide soluble in the diluent can be employed. In general the sodium or potassium mercaptides will be most useful for the reactions carried out in an aqueous medium.

Suitable hypohalites which can be employed in the preferred method are sodium hypochlorite, potassium hypochlorite, calcium hypochlorite, sodium hypobromite, potassium hypobromite, calcium hypobromite, sodium hypoiodite and potassium hypoiodite. The hypohalite also can be formed in situ as for example by the well-known reaction of chlorine and an alkali.

The following specific examples, in which all parts are by weight, will illustrate the preparation of the sulfenimides of this invention.

EXAMPLE 1

To an aqueous solution containing 167 parts of the sodium salt of 2-mercapto-4,5-dimethylthiazole there was added an aqueous solution containing 213.5 parts of 2-chloroimino-3-phenyl-4,5-dimethyl-4-thiazoline. This mixture was heated to 70° C. for about 2 hours during which time a light tan crystalline material precipitated from the aqueous reaction medium. This precipitate was recovered by filtration and was air dried. In this manner 262 parts, an 81% yield, of the precipitate were recovered. This material had a melting point of 119° to 166° C. but after recrystallization from benzene had a melting point of 128° to 129° C. and was identified as N-(3-phenyl-4,5-dimethyl-4-thiazolinyl-2) 4,5-dimethylthiazyl-2-sulfenimide.

Example 2 illustrates the preparation of N-(3-phenyl-4,5-dimethyl-4-thiazolinyl-2) 4,5-dimethylthiazyl-2 sulfenimide by the preferred method hereinbefore described.

EXAMPLE 2

To an aqueous solution containing 80 parts of water and 5.83 parts of sodium carbonate in a reaction vessel equipped with a stirrer, a thermometer for measuring the temperature of the reaction medium, and a charging line, there were added 7.25 parts of 2-mercapto-4,5-dimethylthiazole. This mixture was stirred for about five minutes, and then 0.4 part of a mixture of sodium alkylnaphthalene sulfonates, having an average of six carbon atoms in the alkyl groups, dissolved in 20 parts of water were added to the reactor. Then 12 parts of 2-imino-3-phenyl-4,5-dimethyl-4-thiazoline hydrochloride dissolved in 100 parts of water were added slowly over a period of 20 minutes to the mixture in the reaction vessel with stirring. While vigorously stirring the resulting mixture there was slowly added over a period of one hour 73 parts of an aqueous solution containing 6.3 parts of sodium hypochlorite. As soon as the hypochlorite was introduced into the reaction vessel, a reaction took place and the temperature of the reaction mixture rose to about 35° C. The reaction temperature was maintained between 28° to 32° C. during the addition of the remainder of the hypochlorite. After all the hypochlorite solution had been added, the resulting mixture, which was a slurry of precipitated product, was maintained at about 30° C. for 10 minutes and then was heated to 70° C. as rapidly as possible to hasten the formation and precipitation of the remainder of the product. After about 10 minutes at 70° C., the slurry was removed from the reactor and was filtered to recover the precipitated product which was air dried. In this manner 16.5 parts, a 97% yield, of a material melting at 117° to 130° C. were recovered. This material when purified by recrystallization from a hexane-benzene mixture was a yellow crystalline solid, having a melting point of 128° to 129° C. This purified material was identified as N-(3-phenyl-4,5-dimethyl-4-thiazolinyl-2) 4,5 - dimethylthiazyl-2 sulfenimide having the formula:

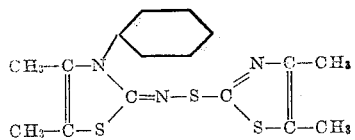

EXAMPLE 3

The process of Example 2 was repeated except that 7.25 parts of 2-mercapto-4-ethylthiazole and 9.65 parts of 2-imino-3-ethyl-4,5-dimethyl-4-thiazoline hydrochloride was employed as reactants. There was recovered 11.3 parts of an oil which on crystallization from a carbon tetrachloride hexane mixture gave a solid crystalline product having a melting point of 41-44° C. This compound was identified as N-(3-ethyl-4,5-dimethyl-4-thiazolinyl-2) 4 - ethylthiazyl - 2 - sulfenimide having the formula

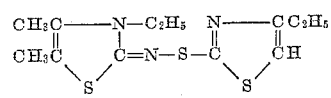

and was found by analysis to have a chemical composition which was in agreement with the composition calculated for the above-named compound as shown below:

By analysis: N, 14.04%. Calculated for $C_{12}H_{17}N_3S_3$: N, 14.03%.

EXAMPLE 4

The process as described in Example 2 was repeated except that 7.5 parts of 2-mercapto-4,5-dimethylthiazole and 12 parts of a mixture containing 85% 2-imino-3-phenyl-4,5-dimethyl-4-thiazoline hydrochloride and 15% 2-imino-3-phenyl-4-ethyl-4-thiazoline hydrochloride were employed as reactants. There was recovered 16.2 parts, a 95% yield, of a product which melted at 108° to 140° C. and was found to contain 85% N-(3 - phenyl-4,5-dimethyl-4-thiazolinyl-2) 4,5-dimethyl-thiazyl-2 sulfenimide (formula appearing in Example 2) and 15% N-(3-phenyl-4-ethyl-4-thiazolinyl) 4,5-dimethyl-thiazyl-2 sulfenimide which has the formula

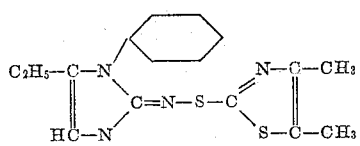

EXAMPLE 5

The process of Example 2 was repeated except that 9.2 parts of 2-mercaptobenzothiazole and 12 parts of 2-imino-3-phenyl-4,5-dimethyl-4-thiazoline hydrochloride were employed as reactants. There was recovered 17.5 parts, a yield of 91%, of a crystalline material having a melting point of 125° to 140° C. After this material was purified by recrystallization from a benzene solution, it had a melting point of 163° to 165° C. and was identified as N-(3-phenyl-4,5-dimethyl-4-thiazolinyl-2) benzothiazyl-2 sulfenimide which had the formula:

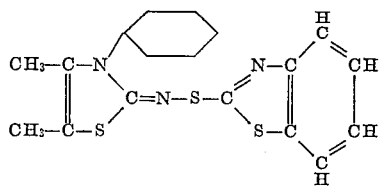

and whose chemical composition as determined by analysis was found to agree with the chemical composition calculated for the above-named compound as is shown below.

*Chemical composition*

| By Analysis | | Calculated | |
|---|---|---|---|
| | Percent | | Percent |
| C | 58.63 | C | 58.50 |
| H | 4.12 | H | 4.09 |
| N | 11.27 | N | 11.37 |
| S | 25.98 | S | 26.03 |

EXAMPLE 6

N-(3-phenyl-4,5-dimethyl-4-thiazolinyl-2) 4,5-dimethylthiazyl-2 sulfenimide was again prepared by the preferred method of Example 2. In this preparation 7.25 parts of 2-mercapto-4,5-dimethyl thiazole were added to an aqueous solution containing 2.0 parts of sodium hydroxide. Then 0.4 part of the sodium alkylnaphthylene sulfonates dissolved in water were added. 12 parts of 2-imino-3-phenyl-4,5-dimethyl-4-thiazoline hydrochloride dissolved in 100 parts of water were slowly added to the aqueous mixture. After the resulting mixture had been cooled to 10° C., 50 parts of an aqueous solution containing 4.3 parts of sodium hypochlorite were added slowly over a period of about one hour while the 10° temperature was maintained and the reacting mixture was vigorously stirred. The reacting mixture was stirred for an additional 20 minutes and the crystalline product which formed was recovered by filtration and dried. In this manner 9.5 parts, a 72% yield, of the desired product which had a melting point of 118° to 128° C. was recovered.

EXAMPLE 7

The process of Example 2 was repeated except that 7.25 parts of 2-mercapto-4,5-dimethylthiazole and 9.8 parts of 2-imino-3,4,5-trimethyl-4-thiazoline hydrochloride were employed as reactants. There was recovered 13.65 parts, a 91% yield, of a crystalline product which has a melting point of 142° to 145° C. This material was identified as N-(3,4,5-trimethyl-4-thiazolinyl-2)-4,5-dimethylthiazyl-2 sulfenimide having the formula

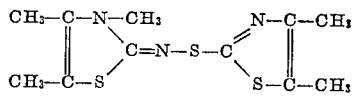

and having a chemical composition as determined by analysis which agrees with the composition calculated for the above-named compound as is shown below:

*Chemical composition*

| By Analysis | | Calculated | |
|---|---|---|---|
| | Percent | | Percent |
| C | 46.62 | C | 46.28 |
| H | 5.44 | H | 5.30 |
| N | 14.57 | N | 14.72 |
| S | 33.54 | S | 33.70 |

EXAMPLE 8

The process of Example 2 was repeated except that 9.2 parts of 2-mercaptobenzothiazole and 9.8 parts of 2-imino-3,4,5-trimethyl-4-thiazoline hydrochloride were employed as reactants. There was recovered 16.7 parts, a 98% yield, of a crystalline material having a melting point of 145°–180° C. but when purified by recrystallizing from benzene had a melting point of 170.5° to 172.5° C. This material was identified as N-(3,4,5-trimethyl-4-thiazolinyl-2) benzothiazyl-2 sulfenimide having the formula:

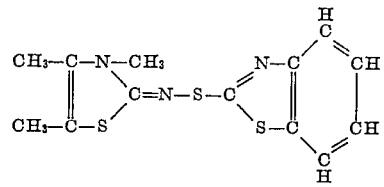

and was found by analysis to have a chemical composition which was in agreement with the calculated composition of the above-named compound as shown below.

*Chemical composition*

| By Analysis | | Calculated | |
|---|---|---|---|
| | Percent | | Percent |
| C | 50.66 | C | 50.78 |
| H | 4.20 | H | 4.26 |
| N | 13.54 | N | 13.67 |
| S | 31.20 | S | 31.28 |

EXAMPLE 9

The process of Example 2 was repeated except that 9.6 parts of 2-mercapto-4,6,6-trimethyl thiazine and 9.8 parts of 2-imino-3,4,5-trimethyl-4-thiazoline hydrochloride were employed as reactants. There was recovered 16.5 parts, a 95% yield, of a product identified as N-(3,4,5-trimethyl-4-thiazolinyl-2)-4,6,6-trimethyl thiazinyl-2 sulfenimide which has the formula:

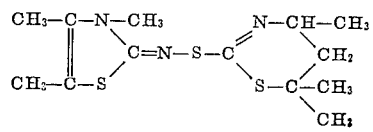

EXAMPLE 10

The process of Example 2 was repeated except that 6.6 parts of 2-mercapto thiazoline and 9.8 parts 2-imino-3,4,5-trimethyl-4-thiazoline hydrochloride were employed as reactants. There was recovered 11 parts, a 76.5% yield, of crystalline material having a melting point of 127° to 151° C. This material after being recrystallized from benzene had a melting point of 132.5° to 135.5° C. and was identified as N-(3,4,5-trimethyl-4-thiazolinyl-2) thiazolinyl-2 sulfenimide having the formula

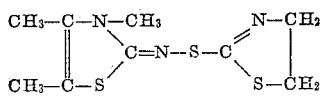

This compound was found by analysis to have a chemical composition which was in agreement with the composition calculated for the above-named compound as shown below:

*Chemical composition*

| By Analysis | | Calculated | |
|---|---|---|---|
| | Percent | | Percent |
| C | 41.60 | C | 41.67 |
| H | 4.98 | H | 5.05 |
| N | 16.07 | N | 16.20 |
| S | 36.96 | S | 37.08 |

EXAMPLE 11

The process of Example 2 was repeated except that 20.57 parts of the dimer of 2-mercapto-4,6,6-trimethyl thiazine and 19.6 parts of 2-imino-3,4,5-trimethyl-4-thiazoline hydrochloride were employed as reactants. There was recovered 36 parts, a 100% yield, of a crystalline product having a melting point of 96° to 140° C. with decomposition. This compound probably has the formula

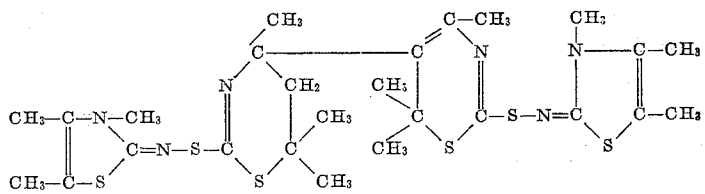

EXAMPLE 12

The process of Example 2 was repeated except that 20.57 parts of the dimer of 2-mercapto-4,6,6-trimethyl thiazine and 9.8 parts of 2-imino-3,4,5-trimethyl-4-thiazoline hydrochloride were employed as reactants. There was recovered 21.6 parts of a solid material having a melting point of 77° to 143° C. with decomposition. This product is similar to the compound of Example 9 except that it is the monosulfenimide.

EXAMPLE 13

The process of Example 2 was repeated except that 7.3 parts of a mixture of alkyl thiazoles containing about 85% 2-mercapto-4,5-dimethylthiazole and 15% 2-mercapto-4-ethylthiazole and 9.64 parts of 2-imino-3-ethyl-4,5-dimethyl-4-thiazoline hydrochloride were employed as reactants. There was recovered 13.6 parts (91% yield) of a product, which had a melting point of 78–175° C. and which contained approximately 85% N-(3-ethyl-4,5-dimethyl - 4 - thiazolinyl-2) 4,5-dimethylthiazyl-2 sulfenimide and 15% N-(3-ethyl-4,5-dimethyl - 4 - thiazolinyl-2) 4-ethylthiazyl-2 sulfenimide which have the formulae

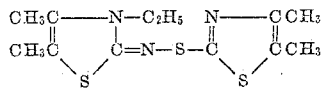

and

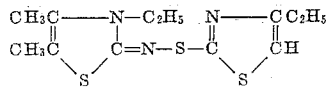

EXAMPLE 14

The process of Example 2 was repeated except that 7.3 parts of a mixture of alkyl thiazoles containing about 85% 2-mercapto-4,5-dimethylthiazole and 15% 2-mercapto-4-ethylthiazole, and 9.64 parts of 2-imino-3-phenyl-4,5-dimethyl-4-thiazoline hydrochloride were employed as reactants. There was recovered 14.2 parts of resinous product which contained 85% N-(3-phenyl-4,5-dimethyl - 4 - thiazolinyl-2) 4,5-dimethylthiazyl-2 sulfenimide and 15% N-(3-phenyl-4,5-dimethyl-4-methyl-4-thiazolinyl-2) 4-ethyl-thiazyl-2 sulfenimide which have the formulae

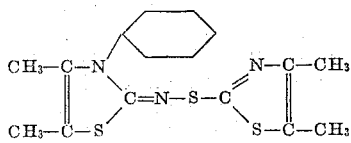

and

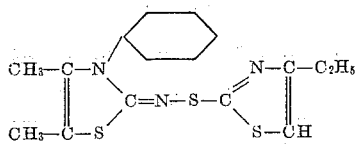

This resinous product had a melting point of 94° to 132° C.

EXAMPLE 15

The process of Example 2 was repeated except that 7.3 parts of 2-mercapto-4,5-dimethylthiazole and 10.5 parts of 2-imino-3-ethyl-4,5-dimethyl-4-thiazoline hydrochloride were employed as reactants. There was recovered 15.8 parts, a 99.5% yield, of N-(3-ethyl-4,5-dimethyl-4-thiazolinyl-2) 4,5-dimethylthiazyl-2 sulfenimide which had a melting point of 107–111° C. after the crude reaction product was recrystallized from benzene. This product had the formula

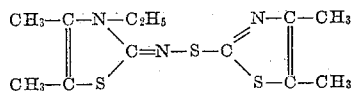

The following two examples illustrate a modification of the preferred process which was previously illustrated by Example 2. In these two examples, sodium hydroxide was employed to form the mercaptide and neutralize the acid salt of the imine.

EXAMPLE 16

*Preparation of N-3-cyclohexyl-4,5-dimethyl-4-thiazolinyl-2) 4,5-dimethylthiazyl-2 sulfenimide*

An aqueous solution containing 1.6 parts of sodium hydroxide dissolved in 100 parts of water, an aqueous solution containing one part of a sodium alkyl-naphthalene sulfonate mixture dissolved in 20 parts of water, and 5.8 parts of 2-mercapto-4,5-dimethyl thiazole were added to a reactor and stirred until all of the thiazole had been converted to its sodium salt. Then an aqueous solution containing 9.9 parts of 2-imino-3-cyclohexyl-4,5-dimethyl-4-thiazoline hydrochloride dissolved in 100 parts of water were added to the reactor. A white precipitate formed and this mixture was stirred vigorously to maintain a uniformly dispersed slurry. To this slurry there was added slowly 44 parts of an 8% sodium hypochlorite solution while the reaction temperature was maintained at 27° to 29° C. About 10 minutes after all the hypochlorite had been added, the reaction mixture was heated to 45° C. and maintained at this temperature for about 15 minutes. The resulting slurry of crystalline material was cooled and filtered. In this manner 13.2 parts, a 94% yield, of crude product was recovered. The crude crystalline product was dissolved in ether. The ether solution was filtered and then concentrated. A purified product was then precipitated from the ether solution by the addition of hexane to the solution. This purified product had a melting point of 110° to 113° C. and was found by analysis to have the following chemical composition which is in agreement with that calculated for N-(3-cyclohexyl-4,5-dimethyl-4-thiazolinyl-2) 4,5-dimethylthiazyl-2 sulfenimide.

*Percentage chemical composition*

| By Analysis | | Calculated | |
|---|---|---|---|
| C | 54.24 | C | 54.35 |
| H | 6.72 | H | 6.56 |
| N | 11.71 | N | 11.88 |
| S | 27.01 | S | 27.01 |

EXAMPLE 17

*Preparation of N-[3-(beta-hydroxyethyl)-4,5-dimethyl-4-thiazolinyl-2] 4,5-dimethylthiazyl-2 sulfenimide*

An aqueous solution containing 2 parts of sodium hydroxide dissolved in 100 parts of water, an aqueous solution containing one part of a sodium alkyl naphthalene sulfonate mixture dissolved in 20 parts of water, and 7.4 parts of 2-mercapto 4,5-dimethyl thiazole were added to a reactor and stirred until all of the thiazole had been converted to its water-soluble sodium salt. An aqueous solution containing 10.4 parts of 2-imino-3-(beta-hydroxyethyl)-4,5-dimethyl-4-thiazoline hydrochloride dissolved in 100 parts of water was added to the aqueous solution in the reactor. A precipitate formed and the stirring was increased to maintain a uniformly dispersed slurry of this precipitate. To this slurry there was added slowly 56 parts of an 8% by weight sodium hypochlorite aqueous solution. There was an immediate temperature increase to about 35° C. The reaction mixture was cooled to 25° and maintained at a temperature of from 25° to 29° C. throughout the time of addition of the hypochlorite. A light yellow precipitate formed during the addition of the hypochlorite. When all the hypochlorite had been added, the reaction mixture was heated to 48° C. for 15 minutes and then cooled to 38° C. The yellow precipitate which formed during the reaction was recovered by filtration. In this manner 14 parts, a 94% yield, of the solid product which had a melting point of 142° to 144° C. was recovered. After recrystallization from a mixture of ethanol and benzene the product had a melting point of 144° to 145° C. By chemical analysis and ultra violet spectra analysis it was determined that the product of this reaction was the desired N-[3-(beta-hydroxyethyl)-4,5-dimethyl-4-thiazolinyl-2] 4,5-dimethyl-thiazyl-2 sulfenimide.

The following example illustrates the ability of the compounds of this invention to accelerate the vulcanization of polymeric organic rubbery materials.

EXAMPLE 18

There was thoroughly mixed together 99 parts of a rubbery copolymer of butadiene-1,3 and styrene prepared by aqueous emulsion copolymerization and known as GR-S-10, 40 parts of carbon black, 1 part of heptylated diphenylamine, 5 parts of zinc oxide, 2 parts of sulfur, 1.5 parts of the compound prepared in Example 2 and 1.5 parts of stearic acid. This composition, hereinafter referred to as Composition A, was heated in a press at 300° F. A vulcanizable composition similar to Composition A but containing 1.5 parts of N-cyclohexyl benzothiazyl-2-sulfenamide in place of the sulfenimide compound of Example 2 was prepared. This composition, hereinafter referred to as Composition B, was also heated in a press at 300° F. These compositions had the following physical properties where M represents the tensile strength in pounds per square inch at 300% elongation, T is the ultimate tensile strength in pounds per square inch, and E is the ultimate percentage elongation.

TABLE I.—VULCANIZATION AT 300° F.

| Time, Min. | Composition A | | | Composition B | | |
|---|---|---|---|---|---|---|
| | M | T | E | M | T | E |
| 10 | | 50 | 890 | | 75 | 790 |
| 20 | 675 | 2,325 | 610 | 800 | 2,025 | 520 |
| 40 | 1,325 | 2,275 | 410 | 1,500 | 2,400 | 390 |
| 60 | 1,325 | 2,200 | 400 | 1,375 | 2,200 | 390 |
| 80 | 1,500 | 2,425 | 390 | 1,675 | 2,525 | 390 |

The data in the table above indicate that the compound of Example 2 used in Composition A is an accelerator for the vulcanization of rubbery copolymers of butadiene-1,3 with styrene. It will also be noted that little or no vulcanization of Composition A had taken place after 10 minutes of heating at 300° F. Composition B which contained N-cyclohexyl benzothiazyl sulfenamide as the accelerator, a commercially available delayed action accelerator, had a higher tensile strength and lower percent elongation after heating for 10 minutes at 300° F. than did Composition A which indicates that Composition B had started to vulcanize before Composition A. Thus the sulfenimide of Example 2 is a superior delayed action accelerator.

EXAMPLE 19

The compound of Example 2 was also incorporated into a vulcanizable natural crude rubber composition. This vulcanizable composition was prepared by thoroughly mixing together 100 parts natural crude rubber, 50 parts of carbon black, 5 parts of zinc oxide, 3 parts of stearic acid, 1 part of phenyl-beta-naphthylamine, and 3 parts of sulfur in addition to the accelerator. N-cyclohexyl benzothiazyl sulfenamide, bis-(2-benzothiazyl sulfide) and 2-mercaptobenzothiazole all widely used accelerators for the vulcanization of natural crude rubber were also incorporated into similar vulcanizable compositions. Portions of these compositions were vulcanized at 280° F. for various lengths of time. The physical properties of the resulting vulcanizates together with the amount of accelerator used per 100 parts of rubber are tabulated below where M, T and E have the same significance as defined in the preceding example.

TABLE II.—NATURAL CRUDE RUBBER VULCANIZED AT 280° F.

| Time, Minutes | 0.7 part compound of Example 2 | | | 1.0 part compound of Example 2 | | | 0.7 part N-cyclohexyl benzothiazyl sulfenamide | | | 1.0 part bis-(2-benzothiazyl sulfide) | | | 1.0 part 2-mercapto benzothiazole | | |
|---|---|---|---|---|---|---|---|---|---|---|---|---|---|---|---|
| | M | T | E | M | T | E | M | T | E | M | T | E | M | T | E |
| 5 | | 275 | 800 | 50 | 425 | 850 | 75 | 550 | 740 | 75 | 650 | 780 | 275 | 1,550 | 720 |
| 10 | 325 | 1,750 | 690 | 750 | 3,100 | 670 | 335 | 1,475 | 650 | 600 | 2,375 | 620 | 825 | 2,950 | 620 |
| 20 | 1,260 | 4,000 | 640 | 1,675 | 4,400 | 610 | 1,650 | 4,475 | 640 | 1,400 | 4,150 | 630 | 1,400 | 4,125 | 630 |
| 40 | 1,900 | 4,450 | 570 | 2,200 | 4,425 | 510 | 2,025 | 4,375 | 540 | 1,750 | 4,300 | 580 | 1,900 | 4,475 | 600 |
| 60 | 2,175 | 4,300 | 540 | 2,400 | 4,325 | 470 | 2,125 | 4,450 | 530 | 2,050 | 4,425 | 560 | 1,900 | 4,325 | 560 |
| 80 | 2,125 | 4,175 | 500 | 2,475 | 4,150 | 450 | 2,115 | 3,950 | 480 | 2,000 | 4,100 | 520 | 1,875 | 4,125 | 550 |

This series of tests show that the N-(4-thiazolinyl-2) sulfenimides of this invention are excellent accelerators for the vulcanization of natural crude rubber. They are superior to the thiazyl disulfide and the mercapto thiazole accelerators commonly used to accelerate the vulcanization of natural crude rubber for 0.7 part of the sulfenimide per 100 parts of rubber is substantially equal to 1.0 part of each of the disulfide and the thiazole. The sulfenimide also is a delayed action accelerator for natural crude rubber vulcanization and again is superior for this purpose to the sulfenamide.

EXAMPLE 20

0.7 part of N-(3-phenyl-4,5-dimethyl-4-thiazolinyl-2) benzothiazyl-2 sulfenimide (product of Example 5), 0.7 part of N-(3,4,5-trimethyl-4-thiazolinyl-2) 4,5-dimethylthiazyl-2 sulfenimide (Example 7), and 0.7 part of N-(3,4,5-trimethyl-4-thiazolinyl-2) benzothiazyl-2 sulfenimide (Example 8) were incorporated as the vulcanization accelerator into the natural crude rubber vulcanizable composition described in Example 18. Mooney scorch values of these compositions at 280° F. with the small rotor (1 3/16 inches) were obtained with a Mooney viscometer to determine whether or not these sulfenimides were delayed action accelerators. The data so obtained and the scorch data for a similar composition containing 0.7 part N-cyclohexyl benzothiazyl sulfenamide are given below for purposes of comparison.

TABLE III.—SCORCH DATA OBTAINED AT 280° F. by MOONEY VISCOMETER

| Accelerator | Scorch Time, Min. | Cure Time, Min. |
|---|---|---|
| Product Example 5 | 10.2 | 12.1 |
| Product Example 7 | 11.8 | 13.3 |
| Product Example 8 | 9.5 | 11.5 |
| N-cyclohexyl benzothiazyl-2 sulfenamide | 9.0 | 10.9 |

In Table III above, scorch time is the time in minutes at which there is an increase of three viscosity units above minimum viscosity and cure time is the time in minutes at which the viscosity reaches a value of 33 units above the minimum viscosity. The Mooney scorch data show that the three compounds of this invention (products of Examples 5, 7 and 8) are exceptional delayed action accelerators in that no vulcanization took place until more than 9 minutes after the test began (scorch time) while vulcanization in the comparative composition containing N-cyclohexyl benzothiazyl sulfenamide as the accelerator began 9 minutes after the test began. It is also of interest to note that all three vulcanizable compositions had a fast cure rate (cure time–scorch time), in the range of 1.9 to 2.5 minutes, which indicates that these delayed action accelerators will cause vulcanization to optimum properties to take place in a relatively short time once vulcanization begins. Hence the compounds of this invention are true delayed action accelerators and not merely slow action accelerators.

Other of the members of the new class of thiazolinyl-4-sulfenimides having the formula hereinbefore set forth can be prepared according to the methods described in the specific examples. Also the other members of the thiazolinyl-4 sulfenimides hereinbefore defined and illustrated can be employed as accelerators of vulcanization as described in Examples 18 to 20. In general 0.5% to 10% by weight of the thiazolinyl-4 sulfenimides based on the rubbery material to be vulcanized will be sufficient to achieve the desired acceleration, especially of sulfur vulcanization, of polymeric organic rubbery materials where there is from 0.5% to 20% by weight (based on the rubbery materials) of sulfur present.

The compounds of this invention can be employed as vulcanization accelerators as illustrated above with any vulcanizable composition containing a polymeric organic rubbery material and, as the vulcanizing agent, sulfur or a sulfur donor, that is, a compound which gives up sulfur for vulcanization under the vulcanizing conditions. For example, they may be used with sulfur vulcanizable compositions containing natural crude rubber, natural crude rubber latices and reclaimed natural crude rubber and with such synthetic polymeric organic rubbery materials as polymers of conjugated diene hydrocarbons such as butadiene-1,3, isoprene, 2-methyl butadiene-1,3, and other butadiene-1,3 hydrocarbons, chloroprene and 2-cyano-butadiene-1,3 as well as with copolymers of these conjugated dienes with other unsaturated compounds copolymerizable therewith such as styrene, isobutylene, acrylonitrile (vinyl cyanide) methyl acrylate, methyl methacrylate, and vinylidene chloride. These synthetic organic rubbery polymers and copolymers are well known to the art and are generally prepared by polymerizing the monomeric materials in an aqueous medium at temperatures in the range of 0° to 100° C. Also, the sulfenimide compounds of this invention can be employed with sulfur vulcanizable compositions containing reclaimed synthetic polymeric organic materials.

Although this invention has been illustrated by means of specific examples of specific compounds and specific methods of preparing these compounds, I do not thereby desire or intend to limit myself solely thereto, for as hitherto stated the precise proportions of the reactants employed may be varied, other chemically equivalent reactants may be employed and the reaction conditions may be controlled in accordance with the methods known to chemical synthesis, if desired,

I claim:
1. A method of preparing compounds having the structure

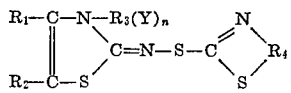

wherein $R_1$ and $R_2$ are selected from the class consisting of hydrogen and hydrocarbon radicals having from one to ten carbon atoms, $R_3$ is a member selected from the class consisting of aliphatic, aryl, aralkyl and cycloalkyl hydrocarbon residues having from 1 to 10 carbon atoms and the furan residue, Y is a member selected from the class consisting of (a) hydrogen attached to said residues, (b) mercapto, hydroxy, carboxy, lower alkoxy, carbo-lower alkoxy and halogen groups attached to said hydrocarbon residues and (c) nitro and sulfonyl groups attached to an aromatic nucleus of said hydrocarbon residues, $n$ represents an integer from 1 to 2 and $R_4$ represents a divalent hydrocarbon radical having not more than 12 carbon atoms, comprising reacting a mercaptide having the structure

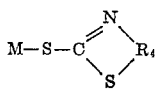

wherein $R_4$ has the same designation as that above and M represents a cation, with a 2-halo-imino-4-thiazoline having the structure

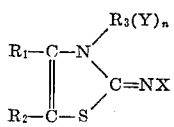

wherein $R_1$, $R_2$, $R_3$, Y and $n$ have the same designation as that above and X represents a halogen.

2. A method of preparing compounds having the structure

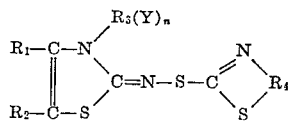

wherein $R_1$ and $R_2$ are selected from the class consisting of hydrogen and hydrocarbon radicals having from one to ten carbon atoms, $R_3$ is a member selected from the class consisting of aliphatic, aryl, aralkyl and cycloalkyl hydrocarbon residues having from 1 to 10 carbon atoms and the furan residue, Y is a member selected from the class consisting of (a) hydrogen attached to said residues, (b) mercapto, hydroxy, carboxy, lower alkoxy, carbo-lower alkoxy and halogen groups attached to said hydrocarbon residues, and (c) nitro and sulfonyl groups attached to an aromatic nucleus of said hydrocarbon residues, $n$ represents an integer from 1 to 2 and $R_4$ represents a divalent hydrocarbon radical having not more than 12 carbon atoms comprising reacting a mercaptide having the structure

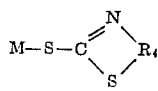

wherein $R_4$ has the same designation as above and M represents a cation with a 2-imino-4-thiazoline hydrohalide having the formula

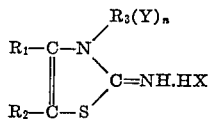

wherein $R_1$, $R_2$, $R_3$, Y and $n$ have the same designation as above and X represents a halogen, in the presence of a hypohalite.

3. The method of claim 2 wherein $R_3(Y)_n$ represents a hydrocarbon radical having from 1 to 10 carbon atoms.

4. The method of claim 2 in which the hypohalite is water-soluble.

5. The method of claim 2 in which the cation is an alkali metal ion.

6. The method of claim 5 in which the hypohalite is sodium hypochlorite.

7. The method of claim 2 where the reactions are carried out in an aqueous medium.

8. A method of preparing compounds having the structure

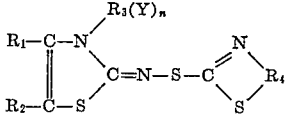

wherein $R_1$ and $R_2$ are selected from the class consisting of hydrogen and hydrocarbon radicals having from one to ten carbon atoms, $R_3$ is a member selected from the class consisting of aliphatic, aryl, aralkyl and cycloalkyl hydrocarbon residues having from 1 to 10 carbon atoms and the furan residue, Y is a member selected from the class consisting of hydrogen attached to said residues, mercapto, hydroxy, carboxy, lower alkoxy, carbo-lower alkoxy and halogen groups attached to said hydrocarbon residues and nitro and sulfonyl groups attached to an aromatic nucleus of said hydrocarbon residues, $n$ is an integer from 1 to 2 and $R_4$ is a hydrocarbon moiety of a 2-mercapto thiazole, said moiety having not more than 12 carbon atoms, comprising reacting in an aqueous medium a sodium salt of a 2-mercapto thiazole with a 2-imino-4-thiazoline hydrochloride having the structure

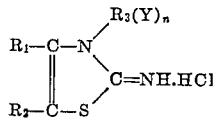

wherein $R_1$, $R_2$, $R_3$, Y and $n$ have the same designation as above, to form a 2-imino-4-thiazoline salt of the 2-mercapto thiazole which precipitates from the aqueous reaction medium, then reacting the aqueous slurry of the imine-mercaptan salt with sodium hypochlorite whereby an N-(4-thiazolinyl-2)thiazyl-2 sulfenimide is formed as a crystalline precipitate, and recovering said sulfenimide.

9. A method of preparing compounds having the structure

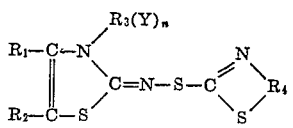

wherein $R_1$ and $R_2$ are members selected from the class consisting of hydrogen and hydrocarbon radicals having from one to ten carbon atoms, $R_3$ is a member selected from the class consisting of aliphatic, aryl, aralkyl and cycloalkyl hydrocarbon residues having from 1 to 10 carbon atoms and the furan residue, Y is a member selected from the class consisting of hydrogen attached to said residues and mercapto, hydroxy, carboxy, lower alkoxy, carbo-lower alkoxy and halogen radicals attached to said hydrocarbon residues and nitro and sulfonyl groups attached to an aromatic nucleus of said hydrocarbon residues, $n$ is an integer from 1 to 2 and $R_4$ is a hydrocarbon moiety of a 2-mercapto thiazoline, said moiety having not more than 12 carbon atoms, comprising reacting in an aqueous medium a sodium salt of a 2-mercapto thiazoline with a 2-imino-4-thiazoline hydrochloride having the structure

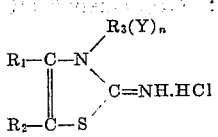

wherein $R_1$, $R_2$, $R_3$, Y and $n$ have the same designation as above, to form a 2-imino-4-thiazoline salt of the 2-mercapto thiazoline, which salt precipitates from the aqueous medium, then reacting the aqueous slurry of the imine-mercaptan salt with sodium hypochlorite, whereby an N-(4-thiazolinyl-2)thiazolinyl-2 sulfenimide is formed as a crystalline precipitate, and recovering said sulfenimide.

10. A method of preparing compounds having the structure

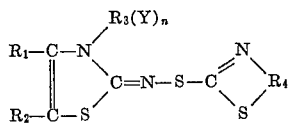

wherein $R_1$ and $R_2$ are members selected from the class consisting of hydrogen and hydrocarbon radicals having from one to ten carbon atoms, $R_3$ is a member selected from the class consisting of aliphatic, aryl, aralkyl and cycloalkyl hydrocarbon residues having from 1 to 10 carbon atoms and the furan residue, Y is a member selected from the class consisting of hydrogen attached to said residues, mercapto, hydroxy, carboxy, lower alkoxy, carbo-lower alkoxy and halogen radicals attached to said hydrocarbon residues and nitro and sulfonyl groups attached to an aromatic nucleus of said hydrocarbon residues, $n$ is an integer from 1 to 2, and $R_4$ is a hydrocarbon moiety of a 2-mercapto thiazine, said moiety having not more than 12 carbon atoms, comprising reacting in an aqueous medium a sodium salt of a 2-mercapto thiazine with a 2-imino-4-thiazoline hydrochloride having the structure

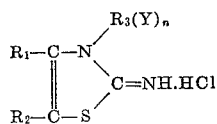

wherein $R_1$, $R_2$, $R_3$, Y and $n$ have the same designation as above, to form a 2-imino-4-thiazoline salt of the 2-mercapto thiazine which precipitates from the aqueous reaction medium, then reacting an aqueous slurry of the imine-mercaptan salt with sodium hypochlorite whereby an N-(4-thiazolinyl-2)thiazinyl-2 sulfenimide is formed as a crystalline precipitate and recovering said sulfenimide.

11. The method which comprises reacting in an aqueous medium the sodium salt of 2-mercapto-4,5-dimethyl thiazole with 2-imino-3-phenyl-4,5-dimethyl-4-thiazoline hydrochloride to form the 2-imino-4-thiazoline salt of the 2-mercapto thiazole which precipitates from the aqueous medium, then reacting an aqueous slurry of this imine-mercaptan salt with sodium hypohalite whereby N-(3-phenyl-4,5-dimethyl-4-thiazolinyl-2) 4,5-dimethylthiazyl-2 sulfenimide is formed as a crystalline precipitate, and recovering the precipitated sulfenimide.

12. The method which comprises reacting in an aqueous medium the sodium salt of 2-mercapto benzothiazole with 2-imino-3-phenyl-4,5-dimethyl-4-thiazoline hydrochloride to form the 2-imino-3-phenyl-4,5-dimethyl-4-thiazoline salt of 2-mercaptobenzothiazole which precipitates from the aqueous medium, then reacting an aqueous slurry of this imine-mercaptan salt with sodium hypochlorite whereby N-(3-phenyl-4,5-dimethyl-4-thiazolinyl-2) benzothiazyl-2 sulfenimide is formed as a crystalline solid, and recovering the precipitated sulfenimide.

13. The method which comprises reacting in an aqueous medium the sodium salt of 2-mercapto-4,6,6-trimethyl thiazine with 2-imino-3,4,5-trimethyl-4-thiazoline hydrochloride to form the 2-imino-3,4,5-trimethyl-4-thiazine salt of 2-mercapto-4,6,6-trimethyl thiazine which precipitates from the aqueous medium, then reacting an aqueous slurry of this imine-mercaptan salt with sodium hypochlorite whereby N-(3,4,5-trimethyl-4-thiazolinyl-2) 4,6,6-trimethylthiazinyl-2 sulfenimide is formed as a crystalline solid, and recovering the precipitated sulfenimide.

14. An N-(4-thiazolinyl-2)sulfenimide having the structure

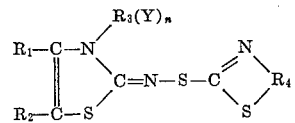

wherein $R_1$ and $R_2$ are selected from the class consisting of hydrogen and hydrocarbon radicals having from 1 to 10 carbon atoms, $R_3$ is a member selected from the class consisting of aliphatic, aryl, aralkyl and cycloalkyl hydrocarbon residues having from 1 to 10 carbon atoms and the furan residue, Y is a member selected from the class consisting of hydrogen attached to said residues, mercapto, hydroxy, carboxy, lower alkoxy, carbo-lower alkoxy and halogen radicals attached to said hydrocarbon residues and nitro and sulfonyl groups attached to an aromatic nucleus of said hydrocarbon residues, $n$ is an integer from 1 to 2, and $R_4$ is a divalent hydrocarbon moiety of a member selected from the class consisting of thiazoles, thiazines and thiazolines said moiety having not more than 12 carbon atoms.

15. N - (3 - phenyl - 4,5 - dimethyl - 4 - thiazolinyl - 2) 4,5 - dimethylthiazyl - 2 sulfenimide having the formula

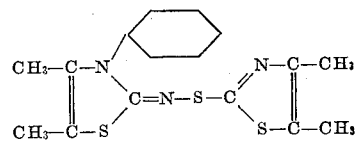

16. N - (3 - phenyl - 4,5 - dimethyl - 4 - thiazolinyl - 2) benzothiazyl - 2 sulfenimide having the formula
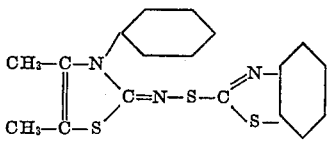
17. N-(3,4,5-trimethyl-4-thiazolinyl-2) 4,6,6-trimethylthiazinyl-2 sulfenimide having the formula
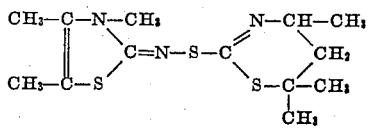
18. N-(3,4,5-trimethyl-4-thiazolinyl-2) thiazolinyl-2 sulfenimide having the formula
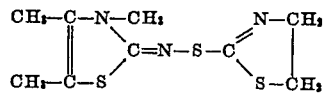
References Cited in the file of this patent
UNITED STATES PATENTS
| Number | Name | Date |
|---|---|---|
| 2,459,736 | Smith et al. | Jan. 18, 1949 |
OTHER REFERENCES
Fieser et al.: "Org. Chem." (1944), p. 32.